United States Patent [19]

Pleyer

[11] Patent Number: 5,583,981
[45] Date of Patent: Dec. 10, 1996

[54] METHOD AND SYSTEM FOR CHANGING THE SIZE OF EDIT CONTROLS ON A GRAPHICAL USER INTERFACE

[75] Inventor: Sven Pleyer, Bellevue, Wash.

[73] Assignee: Microsoft Corporation, Redmond, Wash.

[21] Appl. No.: 267,773

[22] Filed: Jun. 28, 1994

[51] Int. Cl.⁶ .................................................. G06F 15/00
[52] U.S. Cl. ........................................... 395/326; 395/768
[58] Field of Search ..................................... 395/148–149, 395/155–161, 139; 345/117–120, 127–131

[56] References Cited

U.S. PATENT DOCUMENTS

| | | | |
|---|---|---|---|
| 5,444,841 | 8/1995 | Glaser et al. | 395/149 |
| 5,450,538 | 9/1995 | Glaser et al. | 395/149 |

OTHER PUBLICATIONS

Common Programming Interface Presentation Reference, Jun. 1990, IBM, pp. 6–9, 311–317, 353–357, 376, 403–407.
Quattro Pro for Windows V5.0, Building Spreadsheet Applications, Borland Int., 1993, pp. 458–461, 466–479.

Primary Examiner—Kee M. Tung
Assistant Examiner—John E. Breene
Attorney, Agent, or Firm—Seed and Berry

[57] ABSTRACT

A method and system for resizing edit controls of a graphical user interface that in previous systems were of a fixed size. The preferred steps of the resize operation entail moving a mouse cursor over a designated portion of the edit control, activating a mouse button, and dragging a border of the edit control to a new location on the user interface. Upon recognition of these steps, an operating system generates messages indicating that a resize operation is requested. An application retrieves the message from the operating system and sends the message to an application edit control code. Before the message reaches the application edit control code, it is hooked by resize edit control code, which resizes the edit control in response to the messages.

In this way, edit controls that in previous systems were fixed in size can, under the preferred embodiment, be resized. Subsequent use of the edit control after resizing allows data to be received and displayed in an improved manner.

24 Claims, 6 Drawing Sheets

METHOD AND SYSTEM FOR CHANGING THE SIZE OF EDIT CONTROLS ON A GRAPHICAL USER INTERFACE

TECHNICAL FIELD

This invention relates generally to the field of user interfaces, and more specifically, to a method and system for resizing an edit control on a graphical user interface.

BACKGROUND OF THE INVENTION

In the Microsoft Windows™, Version 3.1, Operating System, sold by Microsoft Corporation of Redmond, Wash., edit controls are rectangular regions of a graphical user interface through which a user may edit or type data. One example of an edit control is a text box, which is a box that allows a user to type input data. FIG. 1 illustrates a single-line text box 101 that accepts a single line of input and a multi-line text box 103 that accepts multiple lines of input. Typically, text boxes are found within dialog boxes, such as dialog box 105. A dialog box is a temporary window the application program displays to allow the user to supply input for a program. The text boxes in a dialog box help the user supply file names, choose options, and otherwise direct the action of a command.

To activate a text box the user moves a cursor 107 into the text box using a pointer positioning device, such as a mouse. Once the text box is activated, the user accepts, edits, deletes, or replaces the data currently displayed in the text box using the pointer positioning device or keyboard. For example, the LEFT ARROW and RIGHT ARROW keys on the keyboard may be used to move the cursor 107 to the position in the text box 101 where data entry is to begin.

When the user enters data in the text box that is too long to fit on the current line of the text box, the text box automatically wraps the data to a new line (if a new line exists) or extends the data beyond a boundary 109 of the text box (if a new line does not exist). For example, in the single-line text box 101, data added to the right hand side of the text box causes data to scroll past the left boundary of the text box. Similarly, data added to the left hand side of the text box causes data to scroll past the right boundary of the text box. In the multi-line text box 103, data added to the bottom of the text box causes data to scroll past the upper boundary of the text box while data added to the top of the text box causes data to scroll past the lower boundary of the text box. When data scrolls beyond one of the boundaries of the text box, the data is no longer visible to the user. To access data which scrolls beyond the boundary 109 of the text box 101, the user positions the cursor 107 on the boundary 109 nearest the hidden data, and activates the mouse; in response, the text box automatically scrolls the previously hidden data into the text box. In response to the previously hidden data being scrolled into the text box, previously visible data is scrolled beyond the boundary 109 and is hidden from view of the user. As a result, the user is never able to view all of the contents of the text box together on the screen. Instead, the user is limited to scrolling portions of the data into and out of the visible portion of the text box.

FIG. 2 is a block diagram of a computer system which processes edit control data. A discussion of the components of the computer system is provided immediately below. Then an example is provided which illustrates how these components interact to provide functionality to the edit controls. The computer system 200 includes a computer 201, a video display 203 and an input device 205. The video display 203 displays a main window 207 and the text box 101 within the main window. The computer 201 includes a processing unit 209, a computer memory 211, and an interface 213 for enabling communication between the processing unit 209 and peripheral devices (e.g., the video display 203 and the input device 205).

The computer memory 211 holds a number of components, including a copy of an operating system 215 such as the Microsoft Windows™ Operating System. The operating system 215 provides operating system text box code 217 which performs specified operations for the text box 101. For example, when the user positions an insertion pointer in the text box 101 and enters data using the input device 205, the operating system text box code 217, in cooperation with an application program, displays the entered data in the text box 101. When reference is made to the operating system 215, or a component thereof, performing an operation, those of ordinary skill in the art will understand that the operation is performed by executing the appropriate program code on the processing unit 209. The system queue 225 stores data entered through the input device 205.

The computer memory 211 also includes an application program 219. The application program 219 includes main window code 221 which, in cooperation with the operating system 215, processes user inputs in the main window 207 of the video display 203. The application program 219 also includes application text box code 223 which, in cooperation with the operating system text box code 217, processes user inputs in the text box 101. When reference is made to the application program 219, or components thereof, performing a particular operation, those of ordinary skill in the art will understand that the operation is performed by executing the appropriate program code on the processing unit 209. The message loop code 229 of the main window code 221 retrieves data from the system queue 225 for processing by the application program 219.

As the discussion above indicates, edit control processing in prior systems is performed through cooperation between an application program and an operating system. An example of such cooperation will now be described with reference to the components of the system 200. The example below illustrates the system processing which occurs when the user positions an insertion pointer in the text box 101 and enters data using the input device 205.

First, the operating system 215 stores the entered data in its system queue 225. In general, the operating system has initial access to all data entered through the input device 205 (e.g., mouse active data and mouse button down data). The message loop code 229 of the application program 219 retrieves all data stored in the system queue. In general, the application program 219 is the component of the computer system 200 that analyzes the retrieved data to determine the appropriate processing steps to perform. For example, upon receiving the retrieved data, the main window code 221 examines the data to determine which soft-ware module in the application program 219 should be invoked to process the retrieved data. In the present example, the main window code 221 sends the retrieved data to the application text box code 223 because the data was entered while the insertion pointer was positioned in the text box 101. Thus, data entered in the text box 101 is sent directly from the main window code 221 to the application text box code 223. The application text box code 223 examines the retrieved data and determines that the data was entered for display in the text box 101. Therefore, the application text box code 223 sends the retrieved data, along with a TextOut request, to the operating system text box code 217. The operating system text box code 217 displays the entered data in the text box 101.

In prior systems edit controls were of a fixed size. Neither prior operating systems nor prior applications were programmed to modify the size of an edit control. Thus, users of these systems were required to scroll data into and out of the edit controls.

SUMMARY OF THE INVENTION

In a preferred embodiment of the present invention, a user moves a mouse cursor over a designated portion of the edit control, activates a mouse button, and drags a border of the edit control to a new location on the user interface. The edit control is resized according to the location of the border when the user deactivates the mouse button.

The preferred embodiment also provides a method and system for disabling the resize operation in the vertical direction, or the horizontal direction, or both the vertical and horizontal directions. Finally, the preferred embodiment provides for limiting any resize operation to a preset maximum range and a preset minimum range so that the resized edit control does not conflict with the other user interface elements.

The preferred embodiment also provides a method and system for easily modifying existing applications and operating systems to provide this resizing capability.

The present invention provides advantages over existing methods and systems because controls of current systems have a fixed size and cannot be resized to meet a user's visual needs. By providing a system which allows the user to resize edit controls, the user can arrange the user interface for optimal data entry, data retrieval, and data processing. In short, the use of the edit control after the resizing operation allows data to be received and displayed in an improved manner. In this way, the efficiency of the overall data processing system embodying the preferred embodiment is improved.

DETAILED DESCRIPTION OF THE INVENTION

An embodiment of the present invention provides a method and system for resizing and using edit controls of a graphical user interface. Typical edit controls include buttons, check boxes, list boxes, text boxes, read-only pop-up text fields, sliders, static text fields, and group boxes. In the preferred embodiment, the user moves a mouse cursor over a designated portion of the edit control, activates a mouse button, and drags a border of the edit control to a new location. The edit control is resized according to the location of the border when the user deactivates the mouse button. The resized edit control is then used for more efficient data entry. In this way, the user is given the flexibility to resize the edit control when and how the user desires. Subsequent use of the edit control after resizing allows data to be received and displayed in an improved manner. The preferred embodiment provides a method and system for disabling the resize operation in the vertical direction, or the horizontal direction, or both the vertical and the horizontal directions. Finally, the preferred embodiment provides for limiting any resize operation to a preset maximum range and a preset minimum range. In this way, the resized edit control can be prevented from unnecessarily conflicting with other user interface elements.

Figure 1:
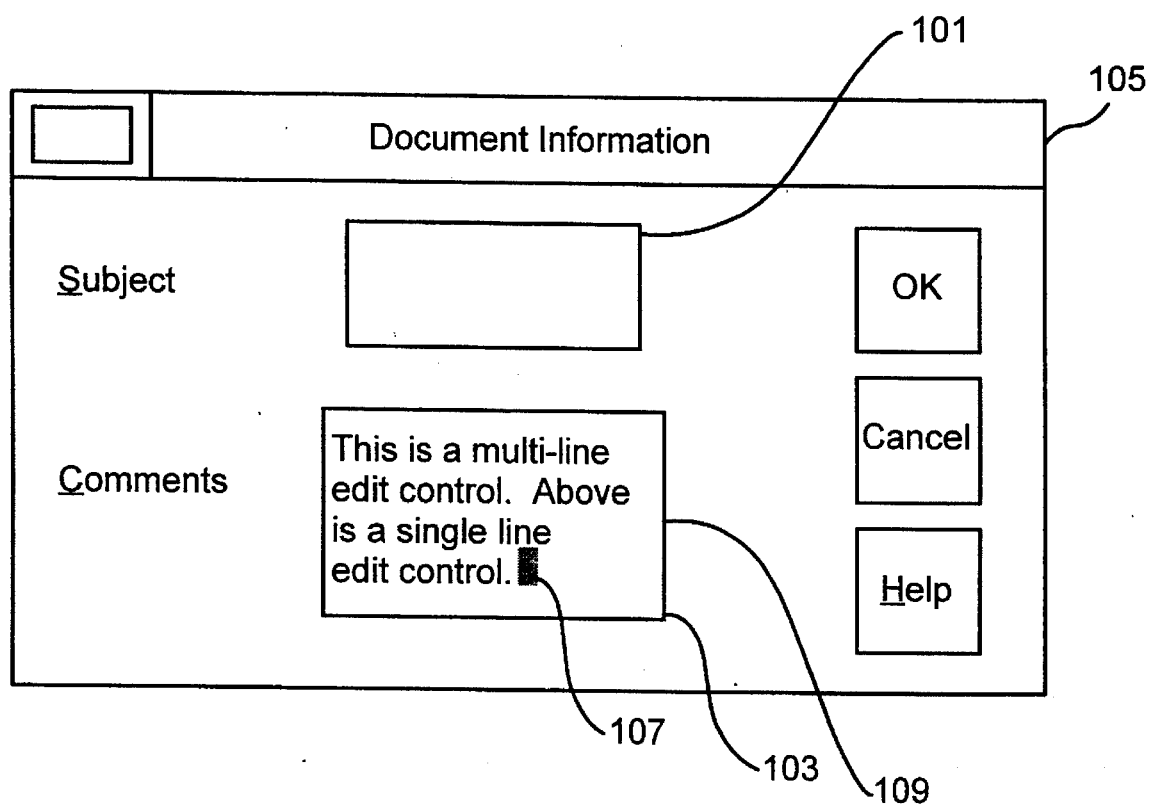
FIG. 1 illustrates a single-line text box and multi-line text box in prior art display systems.
Figure 2:
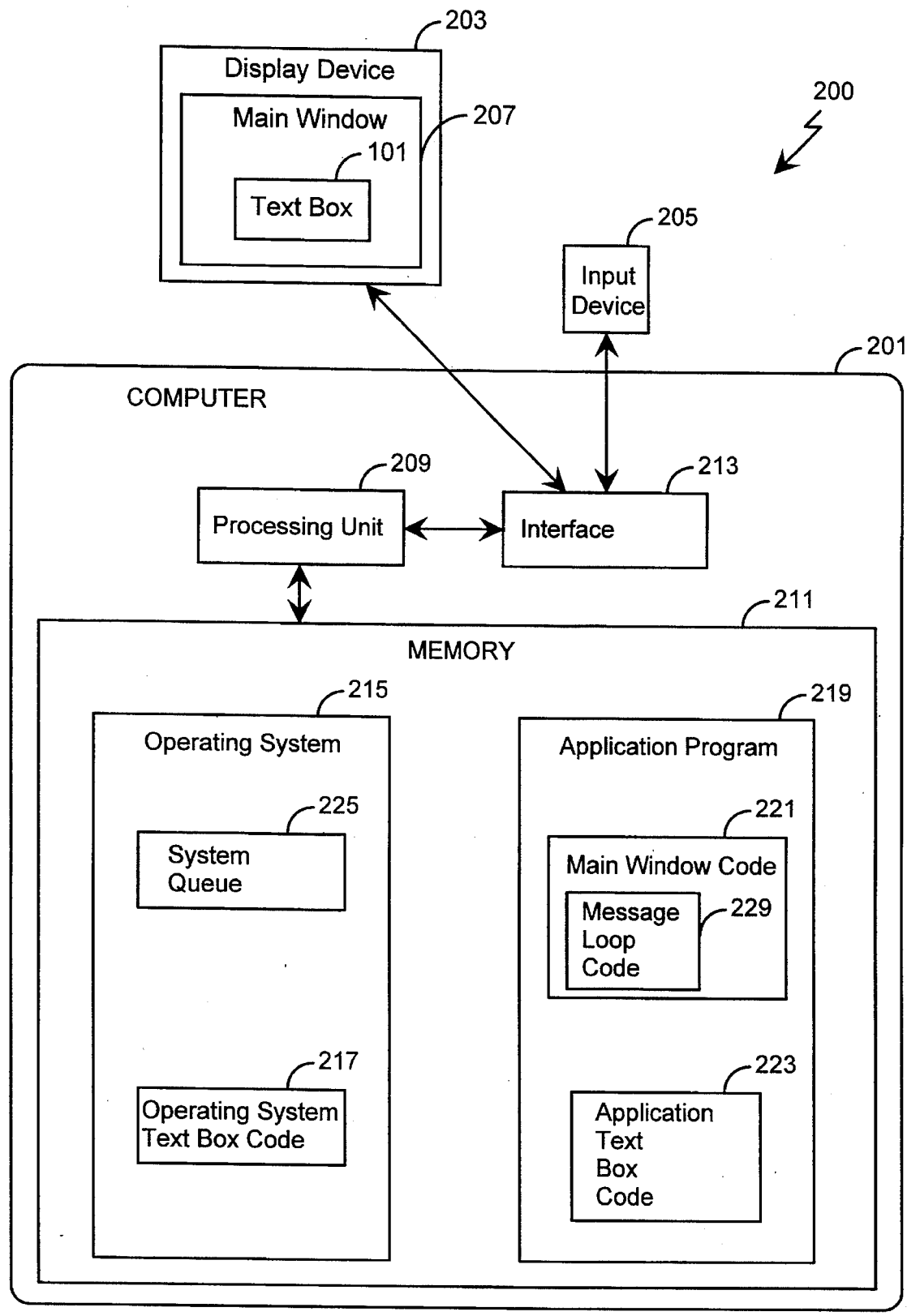
FIG. 2 is a block diagram of a prior art computer system which performs data processing for edit controls.
Figure 3:
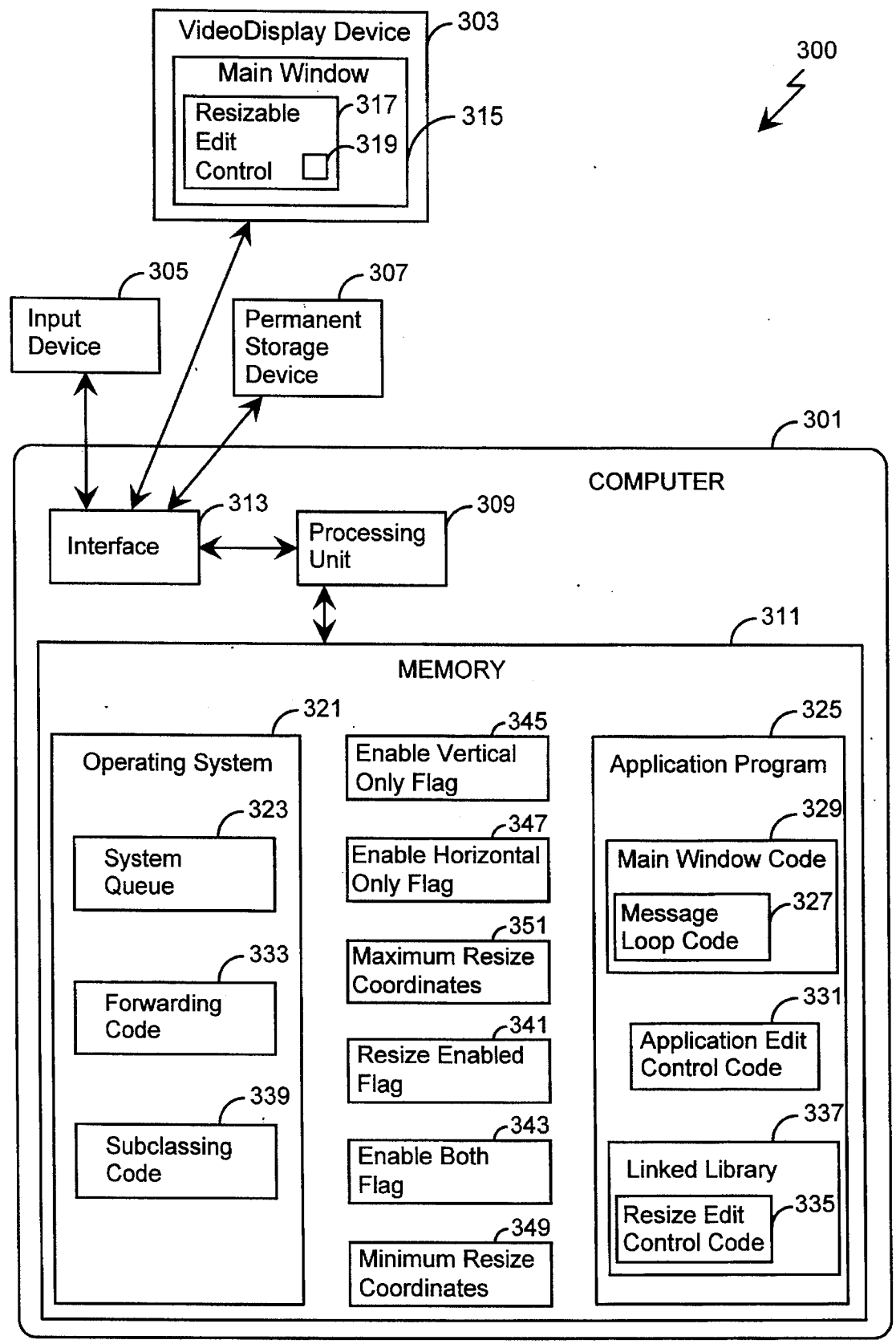
FIG. 3 is a block diagram of a computer system for practicing the preferred embodiment of the present invention.

FIG. 3 is a block diagram of a computer system 300 for practicing the preferred embodiment of the present invention. The computer system 300 includes a computer 301, a video display device 303, an input device 305, such as a mouse, or pointing device, and a permanent storage device 307, such as a disk drive. The computer 301 includes a processing unit 309, a computer memory 311 and an interface 313 for enabling communication between the processing unit 309 and peripheral devices (e.g., the video display device 303, the input device 305 and the permanent storage device 307).

The computer memory 311 holds a number of components, including a copy of an operating system 321, such as a modified version of the Microsoft WINDOWS Operating System, Version 3.1, (sold by Microsoft Corporation of Redmond, Wash.). The operating system 321 is responsible for controlling the allocation and usage of system resources, such as the memory 311, the processing unit 309, and the permanent storage device 307.

The video display device 303 displays a main window 315 which includes a resizable edit control 317. The functioning of the resizable edit control 317 is substantially similar to the functioning of edit controls in the Microsoft WINDOWS Operating System 3.1. The primary difference being that the resizable edit control 317 preferably includes a resize button 319 for facilitating the resizing of the resizable edit control. The preferred resize operation entails positioning a cursor over the resize button 319, activating the input device 305, dragging the cursor to a new location, and finally, deactivating the input device. In this way the user enters data into the system 300 which indicates the type of resize operation that is requested. In the preferred embodiment, the border of the edit control is continuously redrawn as the input device is dragged to its new location.

As will be explained in more detail below, input processing for the resize button 319 is carried out by subclassing resize edit control code so that the resize edit control code 335 pre-processes data entered in the resize button 319. After subclassing the resize edit control code, if the data requests a resize operation then the resize edit control code 335 performs the resize operation. If the data does not request a resize operation then the resize edit control code sends the data to the application edit control code 331 which processes the data using standard (prior art) processing techniques. In this way, the resize functionality of the present invention can be easily added to systems with pre-existing application edit control code which performs non-resize edit control processing.

Figure 4:
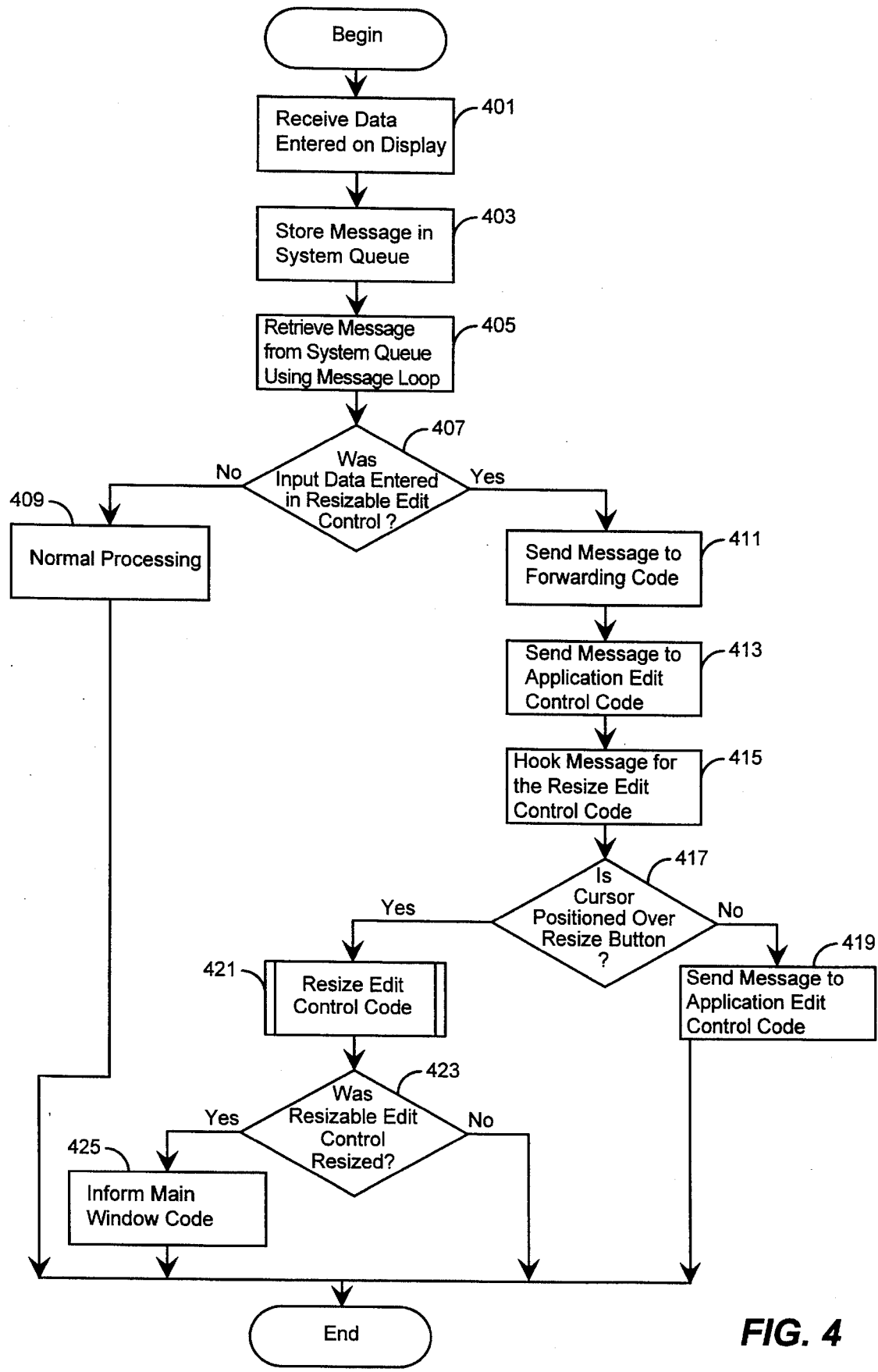
FIG. 4 is a flow diagram for processing data entered in a resizable edit control of the preferred embodiment.

When the user enters data in the resizable edit control 317, the method of FIG. 4 receives a message that indicates the operation to take in response to the entered data and sends it to the resize edit control code 335 which determines whether the message indicates that a resize operation of the resizable edit control should be undertaken. If the message does not indicate that a resize operation should be undertaken, then normal processing is performed by the application edit control code 331. Otherwise, the resizable edit control 317 is resized in accordance with the entered data.

For example, in step 401 the operating system 321 receives data entered on the display device 303. Data is typically entered by moving the input device 305 which, in turn, moves an associated cursor within the main window 315 on the display device 303. In step 403 the operating system 321 stores in a system queue 323 a message which indicates the operation to undertake in response to the data entered on the display device 303. In step 405 the message stored in the system queue 323 is retrieved. In the preferred embodiment, an application program retrieves the stored message by invoking message loop code 327 residing within main window code 329. The message loop code 327 checks the system queue 323 and retrieves the message stored in the system queue 323 that is destined for the main window or any of its child windows. In step 407 the main window code 329 analyzes the message retrieved by the message loop code 327, and sends the message to the appropriate code module for further processing.

For example, if the message indicates that data was entered in the resizable edit control 317, then the main window code 329 sends the message to the application edit control code 331 via the forwarding code 333 (steps 411 and 413).

Before the message reaches the application edit control code 331, however, resize edit control code 335, preferably stored in a dynamic linked library 337, hooks the message for preprocessing (step 415). A dynamic link library is an executable module containing functions that applications can invoke to perform tasks. In this way, an operating system is able to efficiently make its functions and resources available to applications. The process of hooking a message destined for the application edit control code 331 is preferably implemented using subclassing code 339 of the operating system 321 which subclasses the resize edit control 335 to the application edit control code 331. Such subclassing functionality can be found, for example, in the Microsoft WINDOWS Operating System, Version 3.1, from Microsoft Corporation of Redmond, Wash.

Once the resize edit control code 335 receives the message, it determines whether the message indicates that a cursor is positioned over the resize button 319 of the resizable edit control 317 (step 417). In short, step 417 is performed because a resize operation in the preferred embodiment is initiated by placing the cursor over the resize button 319.

If the message indicates that the cursor is not positioned over the resize button 319, then a resize operation is not being requested. Therefore the message is sent from the resize edit control code 335 to the application edit control code 331, where normal edit control processing occurs (step 419).

Figure 5:
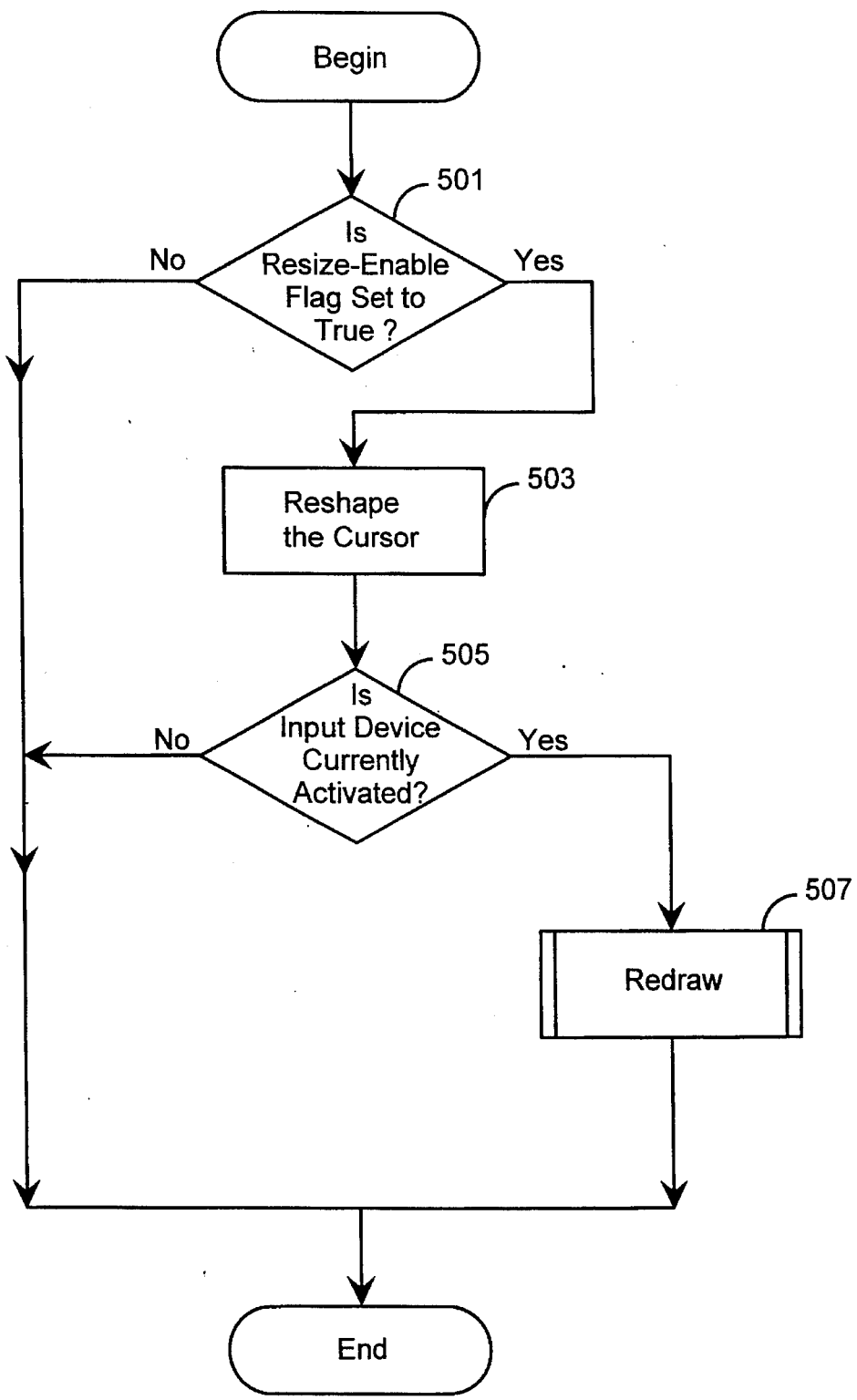
FIG. 5 is a flow diagram of a preferred method for processing a resize request.

FIG. 5 is a flow diagram of the preferred method for processing a resize request. In step 501 the resize edit control code 335 determines whether the resize functionality of the resizable edit control 317 is enabled by examining a resize-enable flag 341 stored in the memory 311. When the resize-enable flag is set to the value "TRUE," the system 300 permits the resizable edit control 317 to be resized. When the resize-enable flag 341 is set to the value "FALSE," the system 300 does not permit resizing of the resizable edit control 317. Therefore, in step 501, if the resize-enable flag is set to the value "FALSE," then processing within the resize edit control code 335 ends. However, if in step 501 the resize-enable flag is determined to be "TRUE," then in step 503 the resize edit control code 335 reshapes the cursor. In the preferred embodiment, the cursor is reshaped from a single-headed cursor to a double-headed cursor to indicate that the resize operation can be invoked by performing the steps of activating the input device, dragging the input device, and deactivating the input device. Such a cursor can be found in Table 3.7 of Windows Interface: An Application Design Guide, from the Microsoft Windows Software Development Kit.

As is discussed in more detail below, the user or developer of the application program 325 is given the ability to enable or disable the resize operation in both the horizontal and vertical directions. For example, the user can disable resizing in the horizontal direction so that resizing only occurs in the vertical direction. In the preferred embodiment, the heads of the double headed cursor point in the direction in which resizing is enabled. For example, if the user only enables resizing in the horizontal direction then the heads of the cursor point in the horizontal direction. If the user enables resizing in both the vertical and the horizontal directions then the heads of the cursor preferably point diagonally.

Once the cursor has been reshaped in step 503, the resize edit control code 335 determines whether it has received a message from the system queue 323 via the main window code 329 indicating that the input device is currently activated (step 505). If the input device is not currently activated, then the resize edit control code 335 ends processing because a resize operation is not being requested by the user. However, if the input device 305 is currently activated, then in step 507 the method of FIG. 5 invokes the redraw method of FIG. 6.

The redraw method redraws the border of the resizable edit control 315 on the video display device 303. This redraw operation is a continuous process between steps 601, 605, 607, and 609. The operating system 321 continuously polls the input device 305 and generates messages indicating actions to perform in response to the input, while the application program, in conjunction with the operating system, continuously updates the position of the border of the resizable edit control on the video display device. During this redraw process, the method examines a number of data structures stored in the computer memory 311. The computer memory 311 stores three "enable" flags. The enable-both flag 343 enables resizing of the resizable edit control 317 in both the vertical and horizontal directions when it is set to the value "TRUE." The enable-vertical-only flag 345 enables resizing of the resizable edit control 317 in only the vertical direction when it is set to the value "TRUE." In other words, resizing of the resizable edit control 317 in the horizontal direction is disabled. Likewise, when the enable-horizontal-only flag 347 is set to the value "TRUE," it enables resizing of the resizable edit control 317 in only the horizontal direction. Hence, resizing in the vertical direction is disabled. The minimum resize coordinates 349 set a lower limit to which the resizable edit control 317 can be resized. Similarly, the maximum resize coordinates 351 set an upper limit on the size of the resizable edit control 317. The "enable" flags can be set by a developer or a user of the application program 325.

Figure 6:
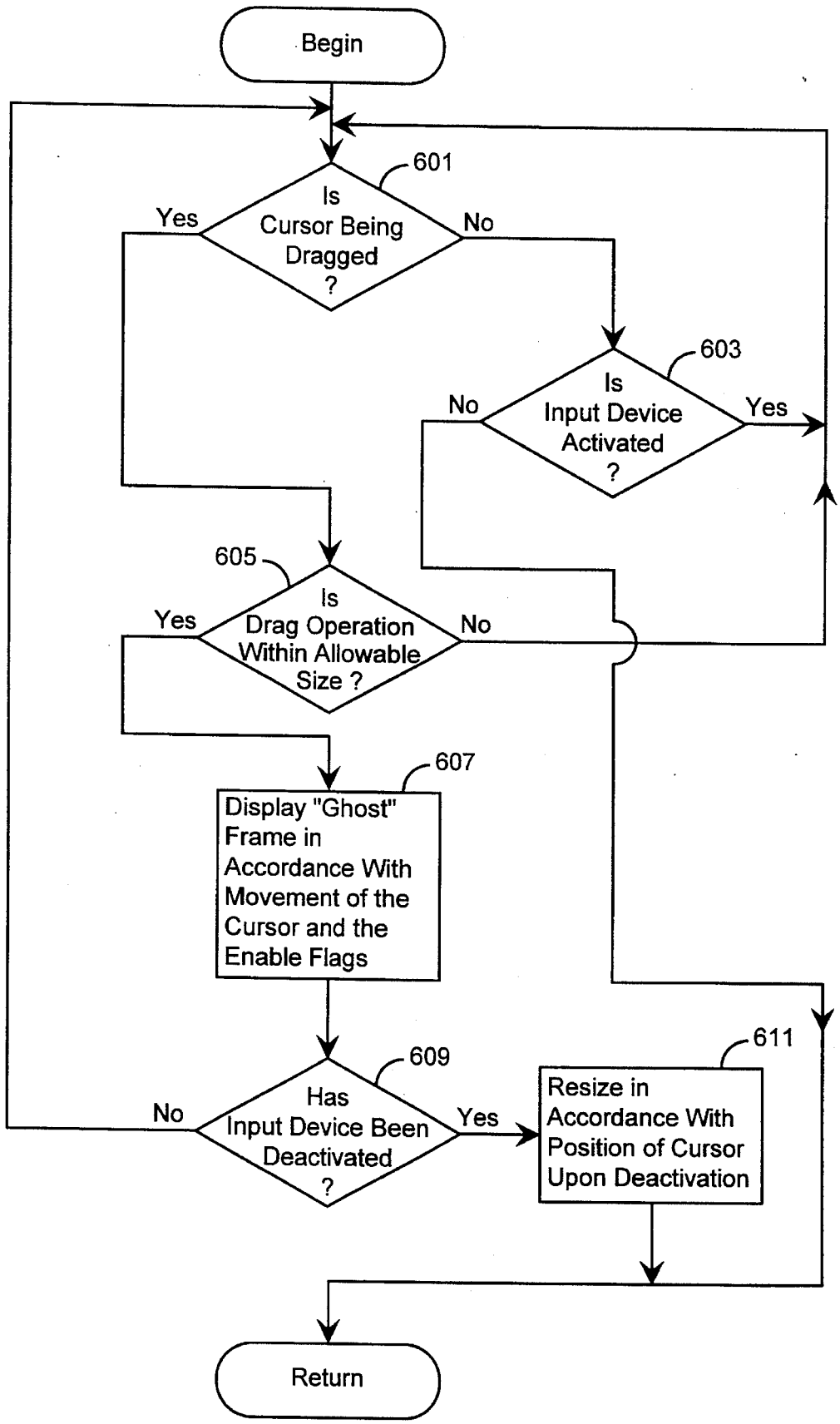
FIG. 6 is a flow diagram of a preferred method for resizing the resizable edit control.

With reference to FIG. 6, the redraw method in step 601 determines whether it has received a message, from the method of FIG. 5, that the input device 305 is being moved so that the cursor is dragged. If the cursor is not being dragged and the input device is still activated (step 603), then processing cycles back to step 601 to await a dragging of the input device by the user or deactivation of the input device by the user. If the cursor is not being dragged and the input device is no longer activated, then processing in FIG. 6 ends and returns to step 423 of FIG. 4 (step 423 is discussed in more detail below).

Returning to the discussion of step 601, if the cursor is being dragged by the user, then the redraw method displays a "ghost" frame which outlines where the edit control will be resized once the input device is deactivated. The "ghost frame" is displayed if two tests are met. First, the redraw method should determine that the drag operation is within the allowable size limits set by the maximum resize coordinates 351 and the minimum resize coordinates 349. Second, the redraw operation should determine that the drag operation is in accordance with the status of the "enable" flags. If the redraw method determines in step 605 that the drag operation is beyond the maximum resize coordinates 351 or below the minimum resize coordinates 349, then the drag operation is disallowed and processing continues with step 601.

In the preferred embodiment, this determination is made by examining messages retrieved from the system queue 323. For example, when the input device 305 is being dragged by the user, some of the messages stored in the system queue 323 contain the new coordinates of the resizable edit control 317 as displayed on the display device 303. The coordinates contained in the retrieved messages are compared with the maximum resize coordinates 351 and the minimum resize coordinates 349 in order to determine if the resize operation is within the allowable size limits.

If the drag operation is within the allowable size, then in step 607 the redraw method displays a "ghost" frame in accordance with the drag operation and the status of the "enable" flags. For example, if the enable-vertical-only flag 345 is set to the value of "TRUE," then the resize operation is only carried out in the vertical direction. If the enable-horizontal-only flag 347 is set to the value "TRUE," then the resize operation is only performed in the horizontal direction. Likewise, if the enable-both flag 343 is set to the value "TRUE," then the resize operation is performed in both the horizontal direction and the vertical direction. In the preferred embodiment, the resizing operation is performed by drawing a "ghost" frame at the coordinates indicated in messages passed from the method of FIG. 5.

In step 609, the redraw method determines whether the input device has been deactivated. If the input device has not been deactivated, then the resize operation continues in step 601. However, if the input device has been deactivated, then the edit control is resized in accordance with the position of the cursor upon deactivation of the input device and the status of the "enable" flags (step 611). Upon completion of the resize operation in step 611, processing continues with step 423 of FIG. 4.

When processing returns from the resize edit control code in step 421 of FIG. 4, the resizable edit control 317 has either been resized on the display device 303 or the resizable edit control 317 remains at its previous size. In step 423 the resize edit control code 335 determines whether the resizable edit control was resized. If it was not resized, then processing within FIG. 4 ends. However, if the resizable edit control 317 was resized, then this resize information is sent from the resize edit control code 335 to the main window code 329 of the application program 325 (step 425). The main window code 329 resets the positions of other components on the user interface in order to accommodate the new size of the resizable edit control 317. Upon completion of step 425, processing in the system 300 related to a resize operation on the resizable edit control 317 ends. Processing unrelated to the resize operation of the resizable edit control 317, however, can continue in the system 300.

In this way, edit controls that in previous systems were fixed in size can, under the preferred embodiment, be resized. Subsequent use of the edit control after resizing allows data to be received and displayed in an improved manner.

Although the present invention has been described in terms of a preferred embodiment, it is not intended that the invention be limited to this embodiment. Modifications within the spirit of the invention will be apparent to those skilled in the art. The scope of the present invention is defined by the claims which follow.

I claim:

1. A method executed in a computer system for resizing an edit control in a specified direction, the edit control displaying data sent to the edit control, the edit control containing a resize portion, the computer system including a display device which displays the edit control, an input device for entering the data that is sent to the edit control for display, and a storage device, edit control code stored in the storage device for processing data entered in the edit control, and resizing code stored in the storage device for processing requests to resize the edit control, the resizing code being associated with the edit control code so that the resizing code receives the data sent to the edit control code before the edit control code receives the data, the method comprising the steps of:

receiving the data sent to the edit control by the input device;

determining that the received data requests a resizing of the edit control in the specified direction;

when the edit control is enabled to change size in the specified direction,
resizing the edit control on the display device in the specified direction in response to the determining that the received data requests resizing; and
providing a means for a user of the computer system to disable resizing of the edit control beyond a maximum size to prevent conflict with other interface elements.

2. The method of claim 1, further comprising the step of entering data in the edit control, said step including:

positioning a cursor on the resize portion of the edit control using the input device; and dragging the input device to move the cursor to indicate the request to resize the edit control.

3. The method of claim 1 wherein resizing of the edit control is disabled by a user of the computer system in a specified direction.

4. The method of claim 3, wherein the method further comprises the step of providing a means for a user of the computer system to disable resizing of the edit control below a minimum size.

5. The method of claim 1, wherein the method further comprises the step of providing a means for a user of the computer system to disable resizing of the edit control below a minimum size.

6. A method executed in a computer system for resizing an edit control in a specified direction, the edit control displaying data sent to the edit control, the edit control including a resize portion, the computer system including a display device which displays the edit control, an input device for entering the data that is sent to the edit control for display, and a storage device which stores edit control code for processing data entered in the edit control and resizing code for processing requests to resize the edit control, the resizing code being associated with the edit control code so that the resizing code receives the data sent to the edit control code before the edit control code receives the data, the method comprising the steps of:

receiving the data sent to the edit control by the input device;

determining that an association exists between the resizing code and the edit control code;

determining that the received data requests a resizing of the edit control in the specified direction;

when the edit control is enabled to change size in the specified direction,
resizing the edit control on the display device in the specified direction with the resizing code in response to the determination that the received data requests resizing; and providing a means for a user of the computer system to disable resizing of the edit control beyond a maximum size to prevent conflict with other interface elements.

7. The method of claim 6, wherein the step of resizing the edit control includes the step of displaying on the display device a ghost frame which outlines where the edit control will be resized.

8. The method of claim 6, wherein the method further comprises the step of providing a means for a user of the computer system to disable resizing of the edit control below a minimum size.

9. The method of claim 6, wherein the method further comprises the step of providing a means for a user of the computer system to disable resizing of the edit control in a specified direction.

10. The method of claim 9, wherein the method further comprises the step of providing a means for a user of the computer system to disable resizing of the edit control below a minimum size.

11. The method of claim 6, wherein the method further comprises the step of providing a means for a user of the computer system to disable resizing of the edit control in both a vertical and a horizontal direction.

12. The method of claim 11, wherein the method further comprises the step of providing a means for a user of the computer system to disable resizing of the edit control below a minimum size.

13. A method executed in a computer system for resizing an edit control in a specified direction, the edit control displaying data sent to the edit control, the edit control including a resize portion, the computer system including a display device which displays the edit control, an input device for entering the data that is sent to the edit control for display, and a storage device which stores edit control code for processing data entered in the edit control, the method comprising the steps of:

providing resizing code for processing requests to resize the edit control;

associating the resizing code with the edit control code so that the resizing code receives the data sent to the edit control code before the edit control code receives the data;

receiving the data sent to the edit control by the input device;

when the received data requests a resizing of the edit control in the specified direction, sending the received data to the resizing code;

resizing the edit control on the display device in the specified direction in response to the received data; and providing a means for a user of the computer system to disable resizing of the edit control beyond a maximum size to prevent conflict with other interface elements.

14. The method of claim 13, wherein the method further comprises the step of providing a means for a user of the computer system to disable resizing of the edit control in a vertical direction.

15. The method of claim 14, wherein the method further comprises the step of providing a means for a user of the computer system to disable resizing of the edit control below a minimum size.

16. The method of claim 13, wherein the method further comprises the step of providing a means for a user of the computer system to disable resizing of the edit control in the horizontal direction.

17. The method of claim 16, wherein the method further comprises the step of providing a means for a user of the computer system to disable resizing of the edit control below a minimum size.

18. The method of claim 13, wherein the method further comprises the step of providing a means for a user of the computer system to disable resizing of the edit control in both the vertical and horizontal direction.

19. The method of claim 18, wherein the method further comprises the step of providing a means for a user of the computer system to disable resizing of the edit control below a minimum size.

20. A computer system for resizing an edit control, the computer system comprising:

a display device which displays the edit control;

an input device for entering data in the edit control;

a data receiver for receiving data entered in the edit control through the input device and for determining that the received data requests a resizing of the edit control;

a resizing module to resize the edit control on the display device in response to the determination that the received data requests resizing when the edit control is enabled to change size in the direction specified by the received data; and means for a user of the computer system to disable resizing of the edit control beyond a maximum size to prevent conflict with other interface elements.

21. The computer system of claim 20, further comprising an edit control module for processing the received data when the received data does not request resizing.

22. A computer system for resizing an edit control in a specified direction, the edit control including a resize portion, the computer system including a display device which displays the edit control, an input device for entering the data in the edit control, and a storage device, the system comprising:

a data receiver for receiving data entered in the edit control through the input device, and for determining that an association exists between the resizing code and the edit control code;

a data sender for sending the received data over a communications path to the resizing code in response to the determination that an association exists;

a second determiner for determining that the received data requests a resizing of the edit control;

an invoker for invoking the resizing code to resize the edit control in the specified direction on the display device in response to the determination that the received data requests resizing when the edit control is enabled to change size in the direction specified by the received data; and means for a user of the computer system to disable resizing of the edit control beyond a maximum size to prevent conflict with other interface elements.

23. A computer system for resizing an edit control in a specified direction, the computer system including a display device which displays the edit control, an input device for entering the data in the edit control, a storage device which stores edit control code for processing data entered in the edit control, and a communication path for sending data entered in the edit control to the code, the system comprising:

a resizing code for processing requests to resize the edit control;

an associater for associating the resizing code with the edit control code so that the resizing code receives data sent to the edit control code before the edit control code receives the data;

a data receiver for receiving data entered in the edit control through the input device;

a determiner for determining an association exists between the resizing code and the edit control code;

an invoker for invoking the resizing code to resize the edit control in the specified direction on the display device in response to the received data when the edit control is enabled to change size in the direction specified by the received data; and means for a user of the computer system to disable resizing of the edit control beyond a maximum size to prevent conflict with other interface elements.

24. A computer-readable storage device containing instructions for controlling a computer system to resize an edit control in a specified direction, the edit control displaying data sent to the edit control, the edit control containing a resize portion, the computer system including a display device which displays the edit control, an input device for entering the data that is sent to the edit control for display, and a storage device, edit control code stored in the storage device for processing data entered in the edit control, and resizing code stored in the storage device for processing requests to resize the edit control, the resizing code being associated with the edit control code so that the resizing code receives the data sent to the edit control code before the edit control code receives the data, the method comprising the steps of:

receiving the data sent to the edit control by the input device;

determining that the received data requests a resizing of the edit control in the specified direction;

when the edit control is enabled to change size in the specified direction,
resizing the edit control in the specified direction on the display device in response to the determining that the received data requests resizing; and providing a means for a user of the computer system to disable resizing of the edit control beyond a maximum size to prevent conflict with other interface elements.

* * * * *